Nov. 28, 1950 — E. F. ROSSMAN — 2,531,532
FLUID FLOW CONTROL DEVICE
Filed May 2, 1947
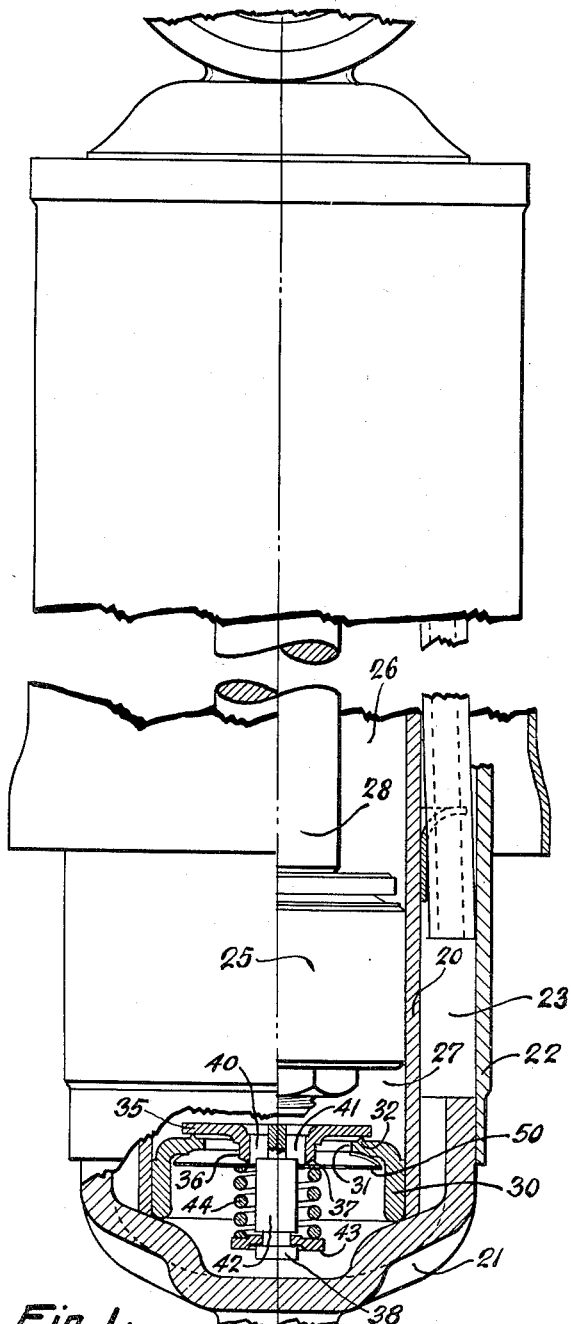
INVENTOR.
EDWIN F. ROSSMAN
BY
Spencer, Hardman and Fehr
HIS ATTORNEYS.

Patented Nov. 28, 1950

2,531,532

UNITED STATES PATENT OFFICE 2,531,532

FLUID FLOW CONTROL DEVICE

Edwin F. Rossman, Dayton, Ohio, assignor to General Motors Corporation, Detroit, Mich., a corporation of Delaware Application May 2, 1947, Serial No. 745,426

6 Claims. (Cl. 277—61)

This invention relates to improvements in fluid flow control devices and especially fluid flow control devices adapted to be used in hydraulic shock absorbers.

It is among the objects of the present invention to provide a two-way fluid flow control device of simple structure and design, adapted to be used in an hydraulic shock absorber.

A further object of the present invention is to provide a unitary, two-way fluid flow control device in which one element thereof performs multiple functions, thereby reducing the number of parts usually provided in a device of this kind.

In the fluid flow control device of the present invention, a single element provides the one way, pressure relief valve, the resilient means which yieldably maintains the other, intake valve, upon its seat, the means for limiting the movement of the intake valve from its seat, and the means for maintaining said intake valve substantially coaxial of the port controlled by the intake valve.

Further objects and advantages of the present invention will be apparent from the following description, reference being had to the accompanying drawing, wherein a preferred embodiment of the present invention is clearly shown.

In the drawing:

Fig. 1 is a fragmentary, sectional view of a direct acting type, hydraulic shock absorber equipped with the present invention.

Fig. 2 is a plan view of the poppet valve member of the device.

Fig. 3 is a fragmentary, sectional view of the device taken in the direction indicated by line 3—3 in Fig. 2.

Fig. 4 is a side view of the disc-valve member of the device.

Fig. 5 is a plan view of the disc-valve member.

Fig. 6 is a sectional view of a modified form of the device.

The two-way fluid flow control device of the present invention is shown applied to a direct acting, hydraulic shock absorber in which the cylinder 20 is supported upon spaced radial ribs in a closure cap 21 secured in a tubular member 22 which surrounds cylinder 20 and forms the fluid reservoir 23. A piston 25 divides the cylinder into two fluid pressure chambers 26 and 27 respectively, the piston having a reciprocative rod 28 attached thereto.

The unitary, two-way fluid flow control device of the present invention is fitted within the cylinder 20 at its end resting upon the closure cap 21. This control device provides for a substantially unrestricted flow of fluid from the reservoir 23 into the cylinder chamber 27 as the piston 25 moves away from the cap 21. In response to a reverse movement of the piston and a consequent pressure upon the fluid in chamber 27, the control device provides a restricted flow from said chamber 27 into the fluid reservoir.

Any suitable fluid flow control mechanism may be provided in the piston to establish controlled fluid flow therethrough in either direction.

The unitary, two-way fluid flow control device of the present invention comprises a cup-shaped valve-cage 30, the outer diameter of which is of such size as to be press-fitted into the end of the cylinder 20 as shown in Fig. 1. The valve-cage 30 has a central opening 31 and on the outside surface of the cage there is provided an annular ridge forming a valve seat 32 surrounding said opening 31.

The opening 31 in the valve-cage 30 is normally covered by what is termed a "poppet valve" 35 which has a centrally apertured disc-shaped portion resting upon the valve-seat 32. Poppet valve 35 has a central, tubular projection 36 which extends through the opening 31 in the valve-cage. The outer, annular edge of said tubular projection provides a valve-seat 37.

A stud 38 has its one end pressed into the tubular extension 36 of the poppet valve 35 so that said stud is rigidly, axially secured to said poppet valve. Diametrically opposite side portions of the end portion of the stud, pressed into the tubular extension 36, are cut away to form the two passages 40 and 41 through said tubular extension. The main body portion 42 of the stud 38 is of lesser diameter than the inside diameter of the tubular extension 36, thus passages 40 and 41 are open at the valve-seat 37 and may discharge fluid around the stud as will later be described. Stud 38 has a detachable abutment collar 43 adjacent its outer end, said collar having one end of the coil spring 44 surrounding stud 38, resting thereupon.

A centrally apertured disc-valve 50 is slidably carried by stud 38 and is yieldably urged upon the valve-seat 37 provided at the end of tubular extension 36 of the poppet valve by the spring 44. Figs. 4 and 5 detailedly illustrate this disc-valve 50. As shown in Fig. 5, disc-valve 50 comprises a disc-shaped body portion 51 having a central aperture 52. A plurality of equally spaced, falciformed members or fingers 53 are provided on the disc-valve 50, the outer, peripheral edges of said fingers being concentric with the aperture 52 and of a diameter less than the inside diameter of the cup-shaped valve-cage 30. The falciformed fingers 53 are bent out of the plane of the flat, disc-shaped body portion 51 as shown in Fig. 4. Due to the fact that the disc-valve 50 is made of comparatively thin sheet metal, and due to the length and also comparatively narrow width of the falciformed fingers 53, they have resilient characteristics whereas the body portion 51 is comparatively stiffer and substantially rigid.

Aperture 52 of valve 50 fits snugly about the stud 38 so as to be slidable thereon yet substantially preventing the passage of fluid between the valve and stud. Urged upon the seat 37, formed by the tubular extension 36 of the poppet valve 35, by the spring 44, disc-valve 50 closes the passages 40 and 41 through the poppet valve. The falciformed fingers 53 of this same disc-valve 50 engage the valve-cage 30, as shown in Fig. 1, the resiliency of those fingers, slightly biased, exerting a pressure upon the spring 44 and the stud 38, yieldably urging the poppet valve 35 upon the seat 32 on the valve-cage 30, thus closing the opening 31 in said cage. As has been mentioned before, the transverse dimension of valve 50 is slightly less than the inside diameter of the valve-cage 30 so that said valve 50, mounted on the stud 38 of the poppet valve 35, maintains said poppet valve substantially concentric with the annular seat 32.

Another function of the disc-valve 50 is to limit the unseating movement of the poppet valve 35. When, due to the movement of the piston 25 away from the valve-cage 30, the poppet valve 35 is lifted from its seat 32 against the effect of the resilient fingers 53 of the disc-valve 50, said fingers may flex until they are bent into the plane of the body portion 51 of valve 50 at which time the comparatively stiff heel portions 63 engage the valve-cage and substantially prevent any further movement of the poppet valve 35 away from its seat 32.

Lifting of the poppet valve 35 from its seat provides for a substantially unrestricted fluid flow from the reservoir 23 through the valve-cage opening 31 into the cylinder chamber 27 beneath the upwardly moving piston.

As the movement of the piston is toward the valve-cage 30, fluid pressure through the passages 40 and 41 against the valve 50 will, when attaining a predetermined value, move valve 50 from seat 37 against the effect of spring 44 and thus a restricted fluid flow will be established from the cylinder chamber 27, through the passages 40 and 41 in valve 35, past valve 50 into the fluid reservoir.

A modified form of control device is shown in the Fig. 6. Here a sleeve 70, having an outwardly extending annular flange 71 is slidably carried by the stud 38, the flange 71 abutting the body portion 51 of the disc-valve 50.

From the aforegoing description, it may be seen that the two-way fluid flow control device of the present invention has a single element, the disc-valve 50, which performs four distinct functions, namely:

(1) A pressure relief valve controlling fluid flow through the poppet valve.

(2) A spring or resilient means for urging the poppet valve upon its seat.

(3) A means for limiting the movement of the poppet valve from its seat.

(4) A means for maintaining the poppet valve substantially concentric with the opening which it controls.

While the embodiment of the present invention as herein diclosed, constitutes a preferred form, it is to be understood that other forms might be adopted, all coming within the scope of the claims which follow.

What is claimed is as follows:

1. A valve mechanism comprising in combination, an apertured valve-cage; a poppet valve on the valve-cage, covering the aperture therein and having fluid flow passages therethrough; a spring loaded disc-valve slidably supported upon the poppet valve and yieldably urged into engagement with said poppet valve to close the fluid passages thereof, said disc-valve having a comparatively rigid body portion from which resilient fingers extend, said fingers engaging the valve-cage and yieldably urging the poppet valve upon the valve-cage, the portions of the fingers adjacent the body portion of the disc valve being comparatively stiff and engageable with the valve-cage to limit the movement of the poppet valve away from said valve cage, the disc-valve cooperating with the valve-cage to hold the poppet valve concentric with the aperture in the valve-cage, and a spring supported upon the poppet valve and engaging the disc-valve, said spring yieldably maintaining the disc-valve against the poppet valve and its fingers against the valve-cage.

2. A valve mechanism comprising in combination, an apertured valve-cage, an apertured valve on one side of the valve-cage; a plug having one end secured in the aperture of the valve so as to provide fluid passages through said valve; a spring loaded disc-valve slidably carried by said plug and yieldably urged into engagement with the said apertured valve to close its fluid passages, said disc-valve having resilient tangs engaging the valve-cage yieldably to hold the said apertured valve upon the valve-cage, said dis-valve having a comparatively rigid portion engageable with the valve-cage to limit the movement of the apertured valve from the valve-cage and cooperating also with the plug and valve-cage to maintain the said apertured valve concentric with the valve-cage, and a spring secured to the plug and engaging the disc valve, said spring yieldably urging the disc-valve upon the apertured valve and the tangs thereof against the valve-cage.

3. A valve mechanism comprising in combination, an apertured valve-cage; a poppet valve on the valve-cage covering the aperture therein, said poppet valve having a central, tubular extension, the end of which provides an annular valve-seat; a stud having one end secured in said tubular extension so as to provide fluid passages through said extension and around the stud, said stud having an abutment collar at its outer end; a disc-valve slidably mounted on the stud; a spring interposed between the disc-valve and abutment collar, said spring yieldably urging the disc-valve upon the annular valve seat provided by the tubular extension for closing the fluid passages therethrough, said disc-valve having a ring shaped body portion which engages the valve-seat; resilient fingers extending from said body portion, the end portions of said fingers normally engaging the valve-cage and exerting a force through said spring for maintaining the poppet valve yieldably upon the valve-cage, said fingers, when flexed completely to engage the valve-cage, limiting the movement of the poppet valve away from the valve-cage, the transverse dimension of said disc-valve being slightly less than the inside diameter of the valve-cage for holding the poppet valve substantially coaxial of the aperture in the valve-cage.

4. A valve mechanism comprising in combination, an apertured valve-cage; a poppet valve on the valve cage, covering the aperture therein, said poppet valve having a fluid flow passage therethrough; a spring supported by the poppet valve means engaged by said spring and yieldably urged thereby against the poppet valve for closing the fluid passage therethrough, said means having resilient portions engaging the valve cage, which portions operate through the spring yieldably to maintain the poppet valve upon the valve-cage.

5. A valve mechanism comprising in combination, a centrally apertured valve-cage having an annular ridge surrounding the aperture to form a valve seat; a poppet valve normally resting upon said seat to cover the aperture, said poppet valve having a central opening; a disc valve; resilient means carried by the poppet valve, said means engaging and yieldably holding the disc valve against the poppet valve for closing the aperture therein; and resilient means on the disc valve, engaging the valve cage, and acting through said first mentioned resilient means yieldably to maintain the poppet valve on the valve-seat provided by the valve cage.

6. A valve mechanism comprising in combination, an apertured valve cage; a poppet valve on said cage normally covering the aperture therein, said poppet valve having a central opening; a single element movably supported on the poppet valve and yieldably urged against it by a spring, said element being operative to perform several functions, first to engage the poppet valve and close its opening, second to yieldably maintain the poppet valve on the valve cage, third to limit movement of said poppet valve from said valve cage and fourth to hold the poppet valve substantially concentric of the aperture in the valve-cage, said single element consisting of a substantially rigid central disc portion which engages the poppet valve to close the opening therein, the central disc portion having resilient tangs extending therefrom and bent out of the plane of said central disc portion, said tangs engaging the valve cage and acting through the spring for yieldably holding the poppet valve upon the valve-cage, the tangs, when flexed into the plane of the central disc portion, limiting the movement of the poppet valve from the valve cage, and their outer edges lying in juxtaposition to the inner surface of the valve-cage to hold the poppet valve substantially concentric of the valve-cage.

EDWIN F. ROSSMAN.

REFERENCES CITED

The following references are of record in the file of this patent:

UNITED STATES PATENTS

| Number | Name | Date |
| --- | --- | --- |
| 1,983,064 | Bates | Dec. 4, 1934 |
| 1,990,516 | Beckel | Feb. 12, 1935 |
| 2,148,839 | Rossman | Feb. 28, 1939 |